United States Patent Office 3,253,714
Patented May 31, 1966

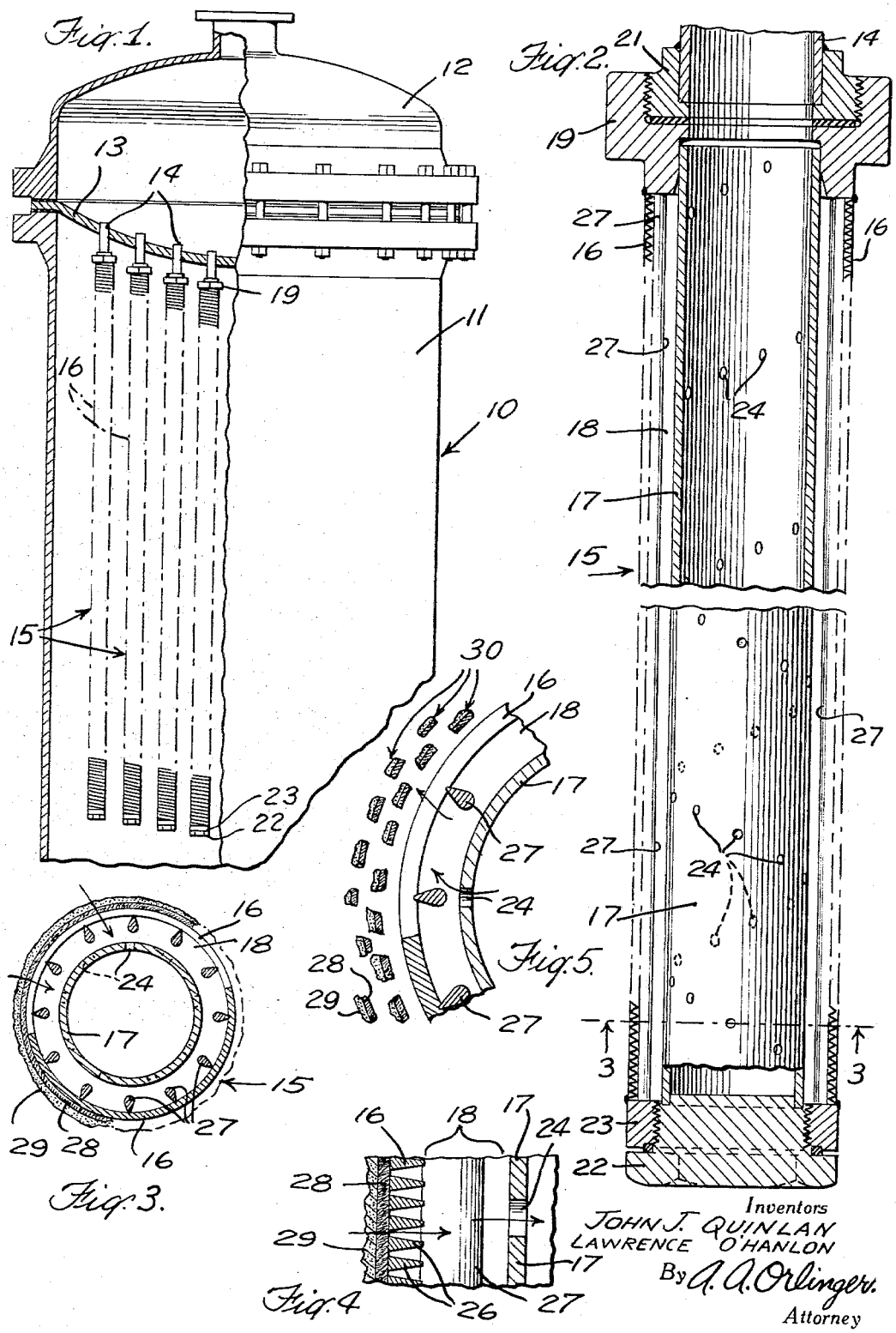

3,253,714
PRESSURE FILTER
John J. Quinlan, Upper Nyack, N.Y., and Lawrence O'Hanlon, Rochelle Park, N.J., assignors to Croll-Reynolds Engineering Company, Inc., New York, N.Y., a corporation of Pennsylvania
Continuation of application Ser. No. 22,252, Apr. 14, 1960. This application Oct. 1, 1963, Ser. No. 313,729
6 Claims. (Cl. 210—333)

This application is a continuation of our copending application Serial No. 22,252, filed April 14, 1960 and now abandoned.

This invention relates primarily to tubular pressure filters wherein (a) a layer of finely divided particles of a suitable filter medium or aid (such as diatomaceous earth, cellulose, carbon, fiber glass, and the like) is deposited on the exterior of a porous, tubular, permanent filter aid support membrane or retainer housed in a closed housing chamber or pressure chamber, (b) liquid to be filtered passes through the filter aid, then through the support-retainer into its interior and out through its top (when its bottom is closed off); and (c) after enough filtered out filter residue or sludge has accumulated on the filter aid layer, the latter together with that residue or sludge is removed by backwashing (i.e. passing backwash liquid into the filter tube interior and through the porous support-retainer) thereby to break off from its exterior the deposited filter aid and sludge.

To provide dependably satisfactory filtration, it is essential to deposit the filter aid in a uniform layer over the entire exterior surface of the support-retainer, and also that, after enough filtered out filter residue or sludge has accumulated, both that sludge and the filter aid be removed uniformly by the backwashing.

A particular feature of the invention is the provision of an improvement that enables repeatedly obtaining of not only dependably uniform deposit of the filter aid over the exterior of the support-retainer, but also of dependably uniformly complete removal of filtered out residue and filter aid in the backwashing step.

While for many uses of a tubular pressure filter, a cylindrical screen comprising helically wound wire welded in spaced apart turns to a multiplicity of cylindrically spaced apart longitudinally-extended rods (e.g. as shown by U.S. Patents 2,046,458, 2,046,457 and 2,346,647) has been preferred and is widely effective as the porous, permanent filter aid support, other tubular support-retainers also are applicable. Such others include ordinary wire mesh screens (mounted on a suitable cylindrical cage where necessary), porous plastic or ceramic, or a plastic simulation (as shown by U.S. Patent 2,314,477) of the above-mentioned helically wound screen, or porous sintered metal.

Filtering capacity of the tubular pressure filter can be increased by increasing the pressure drop. Obviously, the various limitations on increasing the pressure drop necessitate considering increasing the effective filtering surface area. Also practical and economic limitations on increasing the filtering surface area by increasing the tube diameter require increasing tube length as the ultimate direction for obtaining greater filtering area.

However, increased length of the tube increases the difficulty of obtaining dependably uniform deposition of the filter aid as well as dependably uniform removal of it and the filtered out sludge, by backwashing. That then restricts the extent to which the filter tube length can be increased and thus necessitates using a plurality of filter tubes. In turn the diameter of the enclosing housing or pressure chamber must be increased, with need for correspondingly increased floor space.

Thus, an important feature of the invention is in its improvement described specifically hereinbelow, which enables using much longer filter tubes than otherwise possible, and yet at the same time still being able repeatedly to get dependably uniform deposits of filter aid on the supporting-retainer as well as removal of the aid and filter residue or sludge, by backwashing.

The specific character and significant value of this particular feature of the invention is recognized more readily from a consideration of the background and development of the invention. The goal in the use of the tubular pressure filter of the type here concerned is to be able to filter out very fine particles, desirably as low as all through a 325 mesh screen, and even as low as 0.1 micron and lower.

Obviously then, the aim of such results makes it essential that the layer of filter aid initially be deposited (from its admixture in the liquid vehicle depositing medium) uniformly over the entire exterior surface of the filter-aid-deposit support element, regardless of its nature. Thereafter it is likewise essential, after filtered out material (i.e. filter residue) has accumulated to a sufficient extent on the filter aid, that the entire deposit of filter aid and filter residue retained on it be completely removed from the support-retainer exterior. This latter is essential so that the next fresh deposit of filter aid also can be made of practically uniform thickness over that retainer.

The ordinary tubular pressure filters manifest at least the following shortcomings:

They cannot be depended on regularly to enable a uniform layer of filter aid to be deposited over the entire exterior surface of the support-retainer. Commonly the filter aid deposits on it with a greater thickness at the bottom and decreasing thickness at increasingly higher levels.

Much too often in the backwashing, the total deposit of filter aid and accumulated filter residue does not break away completely from the entire exterior of the support-retainer. Too frequently the total deposit might break away from the lower part of the support element's exterior and only do so partly from upper portions of it. This results in costly delay and other expense in the steps followed to remove the rest of that total deposit from the support-retainer.

Because of these two shortcomings, the length of the ordinary tubular pressure filter tubes is limited to about three feet, and possibly up to about four feet in some cases. Beyond such length limits, a useful filter could not be obtained because suitable filter aid deposits could not be expected to be made; and by the same token removal of total deposit of filter aid and filter residue is practically completely unsatisfactory.

In the endeavor to overcome these difficulties, an initial improvement was developed. This embraced placing in the zone encircled by the porous tubular filter-aid support-retainer and concentric with it a tube, briefly called the center tube and which also can be called the deposit-control tube, having indiscriminately distributed a plurality of liquid-passage apertures or holes extending radially through its wall. The total of the peripherally transverse cross-sectional area of all of these liquid passages taken together was at least equal to the area of the cross-section of the interior of the deposit-control tube transverse to its axis.

Such perforated center, or deposit-control, tube provides significant improvement in the substantial regularity with which a uniform layer of filter aid is deposited on the support-retainer and the extent of complete removal, in the backwashing step, of the total deposit of filter aid and filter residue. However, such improvement is possible only with a tubular pressure filter tube of no greater length than about four feet.

That limitation exists even with the use of such a center tube because in attempting to extend the filter length beyond about four feet, useful deposits of filter aid could not be obtained; and also removal of the total deposit of filter aid and filter residue, by backwashing, again was entirely unreliable. Therefore, increase in the total filter surface of the tubular pressure filter having such central tube, could be had only by increasing the diameter of the filter tube to whatever possible extent and especially by increasing the number of such thus limited in length support-retainer tubes, and in turn increasing the diameter (and thus the horizontal cross-section) of the housing or pressure chamber enclosing the tubes.

However, such a pressure chamber of increased horizontal cross-section has at least three undesirable characteristics. Firstly, its cost is inordinately higher in proportion to its filter capacity increase. That is so because of the higher fabricating cost rate not only for the belled head for the top and bottom of the chamber but also for the dished tube sheet from which the plurality of filter tubes is suspended, as compared with the costs of fabricating the corresponding parts for a pressure chamber of smaller diameter even if it has increased height.

Secondly, the chamber of increased diameter requires a stronger dished tube sheet because of the greater extent diametrically, and a correspondingly stronger cylindrical wall to support the necessarily heavier tube sheet, with thus further additional cost. Thirdly, increase in the diameter of the pressure chamber correspondingly increases the projected required floor space. That not only adds to the burden the cost of the additional floor space, but also introduces a still further limiting disadvantage especially when floor space is limited or not available or is competed for by the need for space for some other equipment essential to the plant.

The several foregoing shortcomings and disadvantages are avoided by the feature of principal importance of the invention. According to it, the invention more particularly is that of a tubular pressure filter having one, or more than one, porous tubular support membrane or retainer to receive on its exterior a deposit of a suitable filter aid of the type indicated, and concentrically positioned within each such support-retainer a central or deposit-control tube having effectively distributed over its tubular wall a plurality of an effective number of liquid-passage holes or apertures, the total peripherally transverse cross-sectional area of all of which holes or passages, taken together, is significantly less than the area of the cross-section of the interior of the central tube transverse to its axis.

Such one, or more than one, tubular retainers, each encircling its respective central or deposit-control tube whose wall is perforated with the plurality of liqudi-passage holes whose joint transverse cross-sectional area is significantly less than said interior cross-sectional area of the central tube, is, or are, enclosed in the usual way in an enclosing housing or pressure chamber with its usual connections to the tank for holding the mixture of filter aid and depositing liquid and for holding the backwashing liquid, and to the pump and valves for controlling the sequence of supplying each of them, and its other outlets. Each such individual filter unit having its tubular liquid-pervious filter aid retainer-support encircling its respective center or deposit-control tube, as a whole, conveniently can be referred to as a filter unit assembly.

So far as presently found, the total of the cross-sectional area of all of the liquid-passage holes, taken together, in the central or center tube should be about two-thirds of its interior transverse cross-sectional area, and can vary from about one-third to about eight-tenths of that interior cross-sectional area.

With this relationship between the total of the cross-sectional area of all of the liquid-passage holes of the center tube taken together, to the interior transverse cross-sectional area, the filter will regularly show uniform deposition of the precoat, i.e. initial deposit, of the filter aid, as well as regular clean and complete removal of the joint deposit of filter residue and filter aid, by the backwashing.

At the same time, both of those essential conditions will be obtained not only with such filter unit having a support-retainer or center tube within three or four feet long, but also with such a filter unit having its support-retainer and its center tube over four feet long, for example, even six feet or seven feet long or more.

With that relationship between the total of the cross-sectional area of all of the liquid-passage holes in the center tube to its interior transverse sectional area, and the understanding that the effective filtering area of the filter aid deposit on the support-retainer equals the total of the cross-sectional area of all of the liquid-passage holes in the center tube, then the relationship between the number of those holes (called $n$) and the diameter of each of those holes (called $d$) to the diameter of the center tube (called C) is $n = 2C^2/3d^2$ Thus, selecting a practical diameter (i.e. $d$) for the liquid-passage holes in the center tube for the particular liquid to be handled, say one-sixteenth inch, and selecting an effective inside diameter for the center tube (i.e. C), say, one inch, the number of liquid-passage holes to use is determined by the formula given in the preceding paragraph. These holes then are effectively arranged about the center tube wall. It is most effective for them to be uniformly arranged, for example, a given number such as four about one level, and the same number of them at other levels equally spaced apart along the height of the center tube. They also could be staggered from one level to the next, or they might be arranged in a helical line about the height of the center tube, or in any other uniform arrangement.

The invention is more fully explained by the detailed description below of, but not to be restricted to, an illustrative effective embodiment of it as shown in the accompanying drawings wherein:

FIGURE 1 is a broken elevation of the pressure chamber with the bottom end omitted, and partially in vertical section to show a number of filter tubes as they hang depending from their tube sheet or suspender header;

FIGURE 2 is a more detailed view of one of the filter tubes (of the type shown in U.S. Patent 2,046,458) and embodying the important features of the invention;

FIGURE 3 is an axially transverse, horizontal cross-section along the line 3—3 of FIGURE 2; and showing the relationship concentrically between the center tube and support-retainer of the individual filter unit, and the precoat, i.e., the layer, of filter aid deposit on the retainer;

FIGURE 4 is a fragmentary, enlarged vertical section, showing accumulation of filter residue and the filter aid on the support-retainer; and FIGURE 5 is a fragmentary, enlarged section similar to that of FIGURE 3, and showing the layered deposit of filter residue over filter aid, jointly broken away from the support-retainer, as in backwashing.

Referring to FIGURE 1, the pressure chamber 10 consists of its cylindrical body 11 closed at the top by its ball head 12. Between the latter two, held together by suitable pressure tight clamping means and gaskets, is the tube sheet or suspender header 13. Individual vertical connection nipples 14 are anchored in suitable fluid tight engagement, such as by welding, each in a separate opening in tube sheet 13.

A separate filter unit, (FIGS. 1 and 2) designated 15 as a whole and consisting of a filter-aid support-retainer 16 concentrically surrounding a center tube 17 is suspended in liquid tight engagement from each nipple 14. The inside diameter of each nipple is the same as that of its connected center tube. The upper end of the annular zone 18 between the filter-aid retainer and the center or central tube is closed in liquid tight engagement by coupling parts 19 and 21 with an effective gasket between them and suitable welding of those parts to the retainer and the nipple respectively.

Similarly, the lower end of the annular zone 18 is closed by liquid tight threading of closure cap 22 into bottom ring 23 welded to the lower end of the filter aid support membrane or retainer 16, with the intervention of a suitable O-ring or other effective gasket.

As a result, the only communication between annular zone 18 and the interior of center tube 17 is through the plurality of apertures or holes 24. The number and area of the holes 24, in the plane of a wall of the center tube, i.e. transverse to the axis of the hole if circular, is such that the total of all of the holes taken together is significantly less than the interior transverse cross-sectional area of the center tube and advantageously about two-thirds of the latter area.

FIGURES 3, 4 and 5 show the center tube 17 concentrically disposed within the interior of the filter aid retainer 16 made up of spirally wound wedge-shaped wire 26 welded to the longitudinally extending support rods 27. FIGURES 3 and 4 show the precoat of filter aid 28 deposited on retainer 16 and the filtered out filter residue 29 accumulated on the filter aid. FIGURE 5 shows the chunks 30 of joint filter aid and filter residue completely broken away from the exterior of retainer 16, after the backwashing.

A specific example of a pressure filter of the invention can have a center tube five feet and ten inches long, with outside diameter of one and one-quarter inches, wall thickness of 0.049 inch, total of 144 circular holes of 0.0785 inch diameter (American Standards Ass'n No. 47 twist drill) and arranged four holes at each level and the levels two inches apart between center lines, and eight holes at the topmost level. All of the holes can be arranged with their centers in four elemental lines along the length of the center tube. The four extra holes along the topmost level can be equally spaced between the other four of them. The porous tubular filter aid retainer can be spirally would wedge-shaped wire as in FIGURES 3 and 4 hereof of the type in U.S. Patent 2,046,058, with one and three-quarters outside diameter, 0.060 outside wire width, 0.003 inch gap between turns, and diameter of the cylindrical plane drawn through the innermost edges of the rods 27 being one and one-half inches.

The holes need not be limited to circular but can have any other practically economical and effective outline. The radial width of the annular zone 18 ordinarily should be sufficient to allow filtrate to flow through without increasing the pressure drop.

The effective filtering area of the filter aid deposit on the filter aid retainer is the total open area of the filter aid retainer at the plane bridged by the deposited filter aid, less the area of the impervious portion of the filter aid within said plane bridging the open area of the filter aid retainer.

While the invention has been more fully explained by the foregoing detailed description of a specific embodiment of it, it is understood that various modifications and substitutions can be made in the various elements thereof within the scope of the appended claims which are intended also to embrace equivalents of the disclosed embodiments and variations thereof.

What we claim is:
1. A pressure filter having
    (a) a pressure-withstanding chamber with an inlet for liquid to be filtered and an outlet for filtrate, and wherein a pre-coat layer of particles of a filter aid is to be deposited on the outer surface of a tubular liquid-pervious filter aid retainer before filtering the liquid to be filtered through the filter aid, and periodically filtration is to be stopped and the filter aid and filtered out material accumulated on the outer surface of said retainer is to be removed by backwashing or blowback; and
    (b) at least one filter unit assembly within said chamber intermediate said liquid inlet and filtrate outlet; said at least one filter element comprising
        (i) a rigidly supported tubular liquid-pervious filter aid support-retainer to enable depositing and retaining on its exterior surface a pre-coat layer of filter aid by filtration from a liquid pre-coating mixture fed into said chamber through said inlet;
        (ii) a center tube spaced directly away from the inner surface of said rigidly supported filter-aid support-retainer thereby to provide between said inner surface of said support-retainer and the exterior surface of said center tube an unobstructed annular passage zone for passage of filtrate directly from said inner surface to said center tube and for backwashing liquid to pass from the latter directly to the inner surface of the support-retainer; said center tube serving to receive and lead filtrate away from said annular passage, and in the backwashing stage to receive backwashing liquid fed into said chamber through said outlet for filtrate;
        (iii) a closure at each end of said annular passage and extending from said center tube to said support-retainer; and
        (iv) extending through the wall of said center tube a plurality of liquid-passage orifices, the total open area of all of them being significantly less than, within the range of from about one-third to about four-fifths of, the area of the cross-section of the interior of the center tube taken perpendicular to its axis, said orifices being disposed substantially uniformly over the length of the surface area of said center tube wall; said center tube and tubular support-retainer encircling it being at least about three feet high; and said unit assembly thereby enabling producing by filtration a dependably uniform deposit of filter aid on the tubular support-retainer as well as obtaining by backwashing substantially complete removal of the filter aid and any filtered out material therefrom.

2. A filter unit as claimed in claim 1, wherein the total open area of all of the orifices is about two-thirds of the area of said cross-section of the center tube.

3. A filter unit as claimed in claim 1, wherein the orifices are arranged in spiral array over the wall of the center tube.

4. A filter unit as claimed in claim 1, wherein the relationship between the number of orifices and the diameter of each of them is expressed by the equation $n = 2C^2/3d^2$, wherein $n$ is the number of orifices, $C$ is the diameter of the interior of the center tube, and $d$ is the diameter of an orifice.

5. A filter as claimed in claim 1, wherein a plurality of said filter unit assemblies are included in said chamber.

6. A filter as claimed in claim 5, wherein a tube sheet extends across the interior of said chamber and transversely to its axis and said filter unit assemblies depend from said tube sheet.

References Cited by the Examiner

UNITED STATES PATENTS

| | | | |
|---|---|---|---|
| 654,592 | 7/1900 | Barr | 210—323 |
| 1,706,400 | 3/1929 | Diamond | 210—323 |
| 2,744,632 | 5/1956 | Gardes | 210—323 |
| 2,914,179 | 11/1959 | Foust | 210—323 |

REUBEN FRIEDMAN, *Primary Examiner.*

HARRY B. THORNTON, *Examiner.*